United States Patent

Joel, Jr.

[15] 3,652,803

[45] Mar. 28, 1972

[54] SWITCHING OF TIME DIVISION MULTIPLEX LINES THROUGH TELEPHONE CENTRAL OFFICES

[72] Inventor: Amos Edward Joel, Jr., South Orange, N.J.

[73] Assignee: Bell Telephone Laboratories, Incorporated, Murray Hill, N.J.

[22] Filed: July 30, 1970

[21] Appl. No.: 59,532

[52] U.S. Cl. ......................179/18 J, 179/15 AT, 179/15 BV, 179/15 BW

[51] Int. Cl. ..........................................................H04j 3/00

[58] Field of Search .........179/15 BW, 15 BV, 15 AQ, 18 ES, 179/15 AV, 15.55 T, 15 A, 16 EC, 18 J, 18 GF, 15 BY, 2 DP; 178/50; 340/172.5

[56] References Cited

UNITED STATES PATENTS 3,458,659 7/1969 Sternung..........................179/15 AQ
3,226,485 12/1965 Scheftglowitz...................179/15 BW
3,299,204 1/1967 Cherry et al......................179/15 BW

FOREIGN PATENTS OR APPLICATIONS 981,174 1/1965 Great Britain ...................179/15 AQ

*Primary Examiner*—Kathleen H. Claffy
*Assistant Examiner*—David L. Stewart
*Attorney*—R. J. Guenther and James Warren Falk

[57] ABSTRACT

The communications channels or time slots of time division multiplex lines are enabled to be switched through a conventional common control telephone switching office by providing each line with a plurality of digital trunks, one for each time slot in a frame, extracting call signaling information from the time slots and establishing cross-office connections for each digital trunk. To avoid excessive crosstalk, the contents of each time slot, registered in its respective digital trunk, is outpulsed cross-office at a pulse repetition rate less than the characteristic rate of the time division multiplex line but in a time interval substantially less than the interval occupied by a complete frame of time slots.

9 Claims, 2 Drawing Figures

Figure 1:
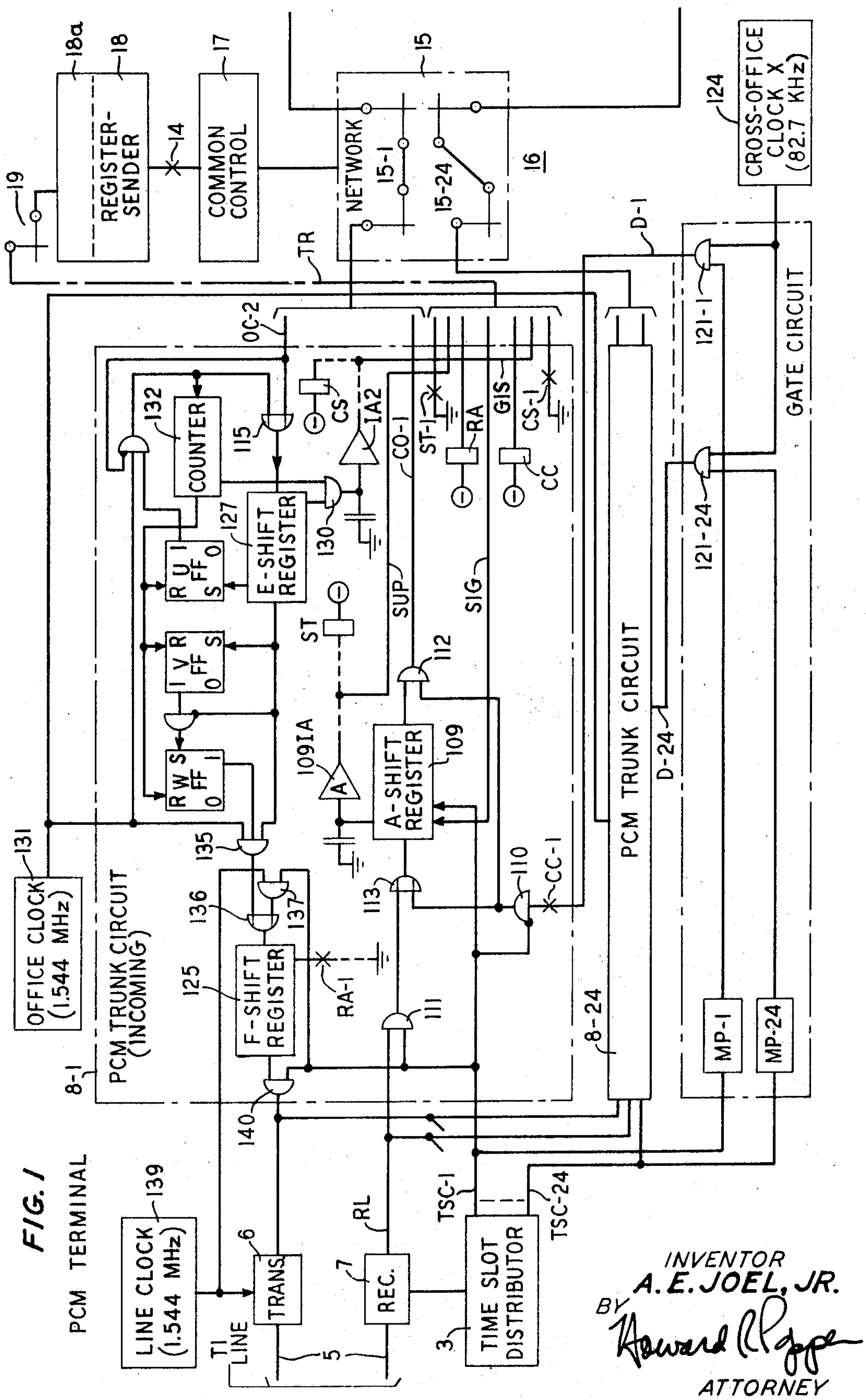

INVENTOR
A. E. JOEL, JR.
BY Howard R Popper
ATTORNEY

SWITCHING OF TIME DIVISION MULTIPLEX LINES THROUGH TELEPHONE CENTRAL OFFICES

BACKGROUND OF THE INVENTION

This invention relates to time division multiplex transmission and more particularly to the switching of time division multiplex lines through conventional telephone central offices.

In one type of prior art time division multiplex transmission system, 24 telephone conversations are periodically sampled and the amplitude of the audio signal of each conversation is digitally encoded and transmitted as a seven-bit pulse sequence. An eighth bit is appended to each seven-bit sample for supervisory signaling. In some versions of this system, the eighth bit may also be used for call signaling information as well. The effective pulse repetition rate for the 24 conversations in this prior art system is of the order of 1.5 megabits per second, a frequency which is too high to be transmitted through conventional telephone central office switching networks without causing excessive crosstalk. Accordingly, it has not heretofore been possible to switch time division multiplex lines through conventional central offices and it has always been thought necessary to completely convert time division multiplex transmission to analog transmission for switching purposes. It appears, however, that frequencies beyond the audio range can be tolerated by certain conventional switching systems, such as the well-known toll and tandem crossbar systems manufactured by the Western Electric Company, without encountering a prohibitive crosstalk level and it is an object of the present invention to adapt time division multiplex lines, such as the well-known T1 carrier system of the Western Electric Company, for digital switching through central offices at a supersonic pulse repetition rate that will insure satisfactory operation.

STATEMENT OF THE INVENTION

In accordance with the principles of the present invention, the coded signals representing the information content of each of the channels of a time division multiplex line are entered into a respective shift register in each of a plurality of digital trunks having appearances on the input side of the telephone office switching network through which the time division multiplex line is to be switched. The call signaling information is extracted from the shift registers and cross-office connections to outgoing trunks, identified by the call signaling information, are made. After the cross-office connection for a channel has been completed, the associated shift register in the digital trunk is outpulsed at a pulse repetition rate that can pass through the switching network without generating excessive crosstalk. The data so transmitted across the office is registered in a corresponding shift register in an outgoing digital trunk on the other side of the switching network. The contents of this latter register are forwarded to the outgoing time division multiplex line under control of a transmitter clock operating at the characteristic pulse repetition rate of the outgoing line.

It is an aspect of my invention that, when a cross-office connection has been effected for the digital trunk corresponding to each communications channel of the time division multiplex line entering the switching office, readout pulses will be applied to the digital trunk's register commencing immediately after that register has been loaded with the information contained in the corresponding time slot of the time division line. Moreover, I contemplate that the cross-office transmission time required to outpulse the contents of any register will be less than the interval of frame repetition so that the overall transmission delay, including the times for loading the shift register in an input digital trunk, transmitting the contents of that register cross-office to a register in the output digital trunk, and delivering the contents of the latter register to the outgoing time division multiplex line will take no more than one frame.

In accordance with another aspect of my invention, the digital trunks which I provide are adapted to operate with a common control of a conventional telephone switching office by extracting call signaling information from a time slot and furnishing that information to the common control to establish a cross-office connection respective to the digital trunk corresponding to the time slot. In accordance with this aspect, I have provided digital trunks which repeat, in digital form, the conventional inter-office signals, such as called party answer, that are normally expected by telephone offices switching analog trunks.

According to one aspect of my invention, the digital trunks may be equipped with an additional buffer to constitute the trunk as a two-way digital trunk. This buffer, which is adapted to be read out under control of the transmitter clock for the time division multiplex line, may, in accordance with my invention, be loaded with information concerning the status of the apparatus employed by the telephone switching office common control. For example, in accordance with this aspect of my invention, I provide for inserting a bit in this buffer to indicate when linkage has been completed to the usual incoming register for receiving call signaling information.

Generally, in accordance with the present invention in one illustrative embodiment thereof, the time slots of an incoming time division multiplex line have their coded information contents stored in a first shift register of a trunk in the incoming side of the switching network. The information is transferred cross office to a shift register in an outgoing trunk circuit during a time interval equivalent to several time slots but less than the frame duration interval of the incoming time division multiplex line, transferred to an output shift register and delivered from the output shift register to the outgoing time division line during an appropriate time slot thereof.

Figure 2:
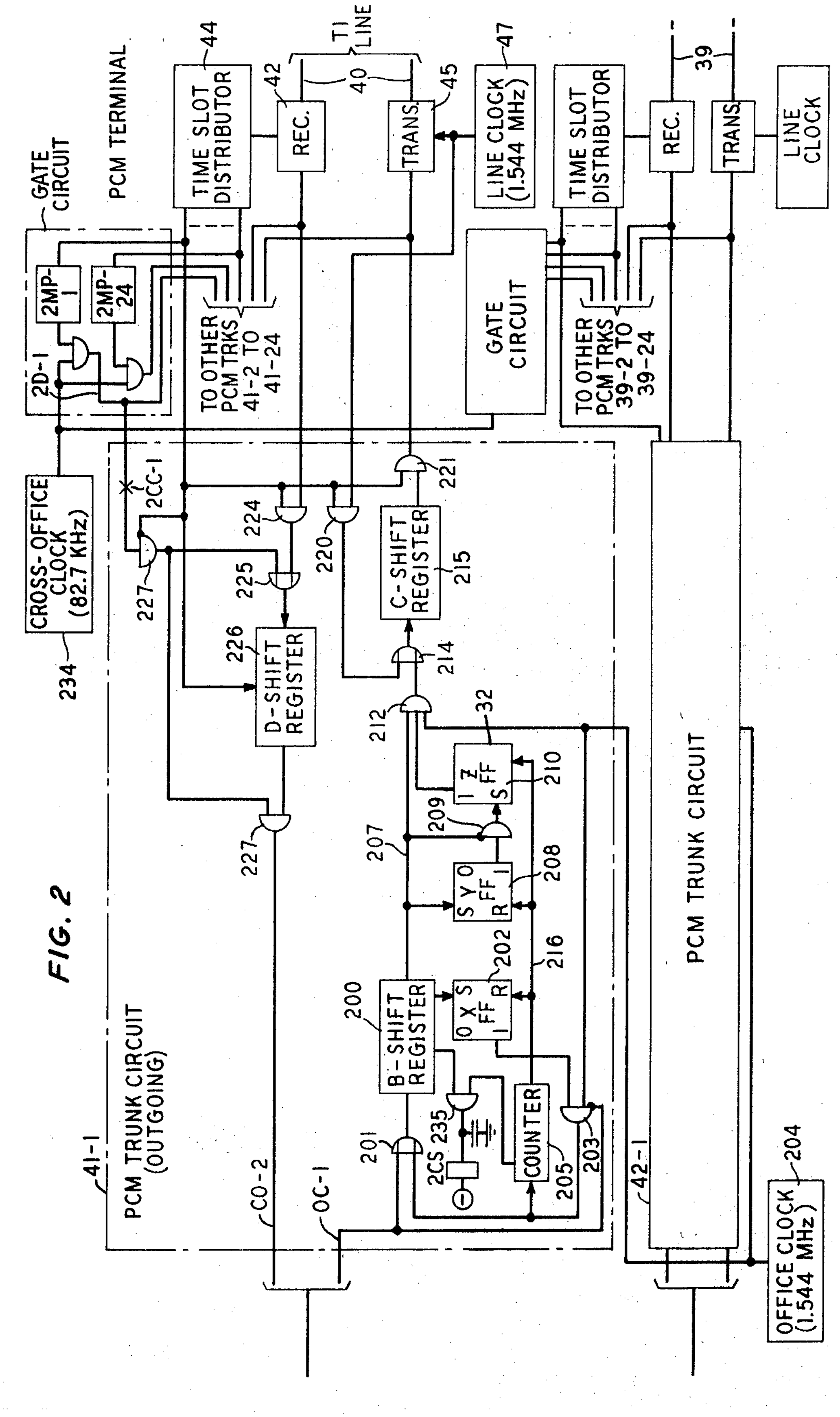

The foregoing and other objects and features of the present invention may become more apparent by referring now to the detailed description and drawing, in which:

FIG. 1 shows a time division multiplex (TDM) line and a plurality of pulse code modulation (PCM) trunks appearing on one side of the switching network of a crossbar central office, which trunks have been adapted in accordance with my invention for switching the channels of the time division multiplex line and FIG. 2 shows the pulse code modulation trunks and time division multiplex lines that appear on the other side of the central office switching network.

Referring now to FIG. 1 there is shown a time division multiplex line 5 which advantageously may be of T1 carrier type manufactured by the Western Electric Company, Incorporated, and described, inter alia, in the Bell Laboratories Record of Nov. 1962 and June 1963. Line 5 is shown equipped for four-wire operation terminating into switching office 16 with a transmitter 6 and a receiver 7. In FIG. 2 two more of office 16's four-wire time division multiplex lines 39 and 40 are shown.

Line 5 carries information pertaining to N different telephone conversations, and N may be assumed to be 24 for convenience. The information for each conversation is encoded in a seven-binary bit sequence that represents an encoded sample of the instantaneous speech amplitude of the conversation and one binary bit that is employed for supervisory signaling. The 24 groups of eight bits each are transmitted in a time interval called a frame which lasts 124.5 microseconds, giving an effective signaling rate of 1.544 megabits per second. Line 5, accordingly, may typically be manufactured of coaxial cable and employ repeaters to avoid transmission loss. Unfortunately, most conventional telephone switching offices cannot transmit binary information at 1.544 megabits per second without causing excessive crosstalk among the trunk circuits entering and leaving the office and it has heretofore been thought necessary to provide special central offices for switching the channels of time division multiplex lines such as 5, 39 and 40.

In accordance with my invention, however, I provide a plurality of digital, or pulse code modulator (PCM) trunk circuits 8—1 through 8—24 for each time division multiplex line to be switched, e.g., one such PCM trunk circuit for every time slot or channel in the frame of multiplex signals carried by line 5. Each of PCM trunks 8—1 through 8—24 has its own appearance in the switching network 15 of telephone switching office 16. Similarly, on the other side of network 15 from line 5, each of the four-wire TDM lines 39 and 40 is associated with a respective plurality of PCM trunks 41—1 through 41—24 and 43—1 through 43—24 each of which has its own appearance in network 15.

Referring again to FIG. 1 and TDM line 5, as the eight-bit patterns carried by the time slots of incoming frames arrive at receiver 7, time slot distributor 3 controlled by receiver 7 sequentially energizes a respective one of its output leads TSC—1 through TSC—24 throughout the duration of each of the corresponding arriving time slots. Accordingly, when the first eight-bit pattern appears on lead RL, distributor 3 energizes lead TSC—1 that is connected to PCM trunk 8—1. The signal on lead TSC—1 enables AND gate 111, blocks inhibit gate 110 and enters an initial "1" bit into the second stage of the nine-bit A-shift register 109. At the same time the first bit of the eight-bit pattern carried by the first time slot channel of line 5 is entered into the first stage of A-shift register 109. As the remaining bits arrive on lead RL, they too are shifted into register 109 so that at the end of the first time slot, register 109 has the eight-bit pattern of the first time slot, preceded by an initial "1" bit in its right-most stage.

When the eight-bit pattern of the second time slot channel of line 5 arrives at receiver 7 and appears on lead RL, it is steered to the second one of PCM trunk circuits 8—1 through 8—24 by the energization of lead TSC—2 (not individually shown). The eight bits of the second time slot are entered into an A-shift register in the PCM trunk circuit 8—2 (not individually shown) in similar fashion to the way in which the first eight-bit sequence was entered into shift register 109 of trunk 8—1. However, the shift register of this second trunk is loaded one time slot interval later than shift register 109. Similarly, each of the other eight-bit sequences is loaded into a respective A-shift register in the remaining ones of trunks 8—1 through 8—24 during its respective time slot interval. Thus, the A-shift registers of PCM trunk circuits 8—1 through 8—24 will contain the space division counterpart of the time division signals carried by line 5 and, accordingly, the information content of line 5 will be de-multiplexed and distributed among the A-shift registers of trunks 8—1 through 8—24.

As is known, the type of information carried by a time slot can vary depending upon the particular variety of time division multiplex system involved. As mentioned before, seven of the eight bits of a time slot will usually be the binary code representing the amplitude of a speech sample and the eighth bit will be used for supervisory and call signaling information. Before the time slot can be used to carry an encoded speech sample, however, call signaling information will have to be transmitted to permit a connection to be established between the called and calling offices. It is immaterial to the present invention whether all of the seven bits normally devoted to speech are commandeered for call signaling purposes or whether only the eighth bit normally used for supervisory signaling will be used. In the drawing, for simplicity, it has been assumed that the eighth bit of the time slot will be used for both supervision and call signaling.

Accordingly, when the time slot information registered in register 109 indicates the arrival of a new telephone call that requires a cross-office connection, the appearance of this pattern in register 109 will cause relay ST to be operated. The path between the left-most (supervisory) bit of register 109 and the winding of relay ST includes an integrating amplifier 109IA which responds to the bit value when it has persisted long enough to indicate an "off-hook" supervisory condition. The remainder of the path between the output of amplifier 109IA and the winding of relay ST is shown dotted to indicate that other relay contacts that would form part of the operating path for a start relay in a conventional incoming trunk circuit are actually present but have been eliminated from the drawing for the sake of clarity.

As is known in conventional crossbar tandem or toll telephone switching systems, after a start relay such as relay ST operates in a trunk carrying an incoming call, an idle register-sender 18 is normally connected to the trunk through a trunk-register link 19. The selection of the idle register and operation of link 19 may advantageously be initiated by a contact ST—1 of relay ST closing and thereby initiating a register-request signal directly to link 19.

As compared to the interval of a time slot or even of a frame of time slots of time division multiplex line 5, a considerable period of time will normally be required for link 19 to connect register-sender 18 to trunk 8—1. While this period will normally be much less than a second, an appreciable manner of time slot intervals will normally have elapsed from the time information for operating relay ST has first been entered into shift register 109 until link 19 is operated. During this interval, the calling office (not shown) at the remote end of line 15 waits for a "register-attached" signal. In a conventional switching system, the register-attached signal would normally be provided to the remote office over the tip and ring conductors directly from register 18. Since time division multiplex line 5 includes no such tip and ring conductors, I have equipped PCM trunk 8—1 with a relay RA to receive the register-attached signal from common control 14. When the register is attached, relay ST will be released by the operation of break contacts (not shown) but indicated generally by the dotted line to the left of its winding. The contact RA—1 of relay RA applies a signal to enter a binary bit representing the register-attached signal into the appropriate stage or stages of F-shift register 125. (The path from contact RA—1 to register 125 is shown dotted to indicate the omission of break contacts of other relays that will operate to remove the signal entering the register-attached bit into register 125 once the remote office (not shown) at the end of line 5 commences sending call signaling information.) The contents of register 125 is, in a manner hereinafter to be described, outpulsed to transmitter 6 and returned to the remote sending office.

When the remote office receives the register-attached signal, it will commence sending called number information that will be received in receiver 7 and entered into A-shift register 109. The digital call signaling information entered into register 109 is detected by amplifier 109IA and applied over lead SUP to register-sender 18. Register 18 then transfers the call signaling information in the usual manner to marker or common control 17 over register-to-marker connector 14.

As is well known from J. W. Gooderham et al. U.S. Pat. No. 2,868,884 or R. N. Breed U.S. Pat. No. 2,848,543, the register will also furnish the marker with trunk class information identifying the type of trunk over which the call signaling information arrived. Common control 17 employs the called number information and the trunk class information to operate network 15 so that a cross-office connection may be established to an outgoing trunk of the type appropriate for the indicated destination. As shown in FIGS. 1 and 2, network 15 has been operated to provide a cross-office link 15—1 to interconnect incoming PCM trunk 8—1 on the left-hand side of network 15 with outgoing PCM trunk 41—1 on the right-hand side of network 15. In similar fashion, the call signaling information entered into the A-shift register of each of the remaining ones of trunks 8—1 through 8—24 may be used by common control 17 to establish a respective cross-office path in network 15 for the other channels carried by line 5. For the sake of clarity in the drawing, however, only one of these other cross-office paths, namely path 15—24, is shown connecting trunk 8—24 in FIG. 1 with trunk 43—1 of FIG. 2.

After the cross-office connection 15—1 has been made in office 16, common control 17 through register 18 and trunk register link 19 operates relay CC in trunk 8—1. Normally register-sender 18 after establishing a cross-office connection would "split" the incoming trunk and proceed to send forward an off-hook signal to the called office (not shown) at the remote end of the selected outgoing trunk. In accordance with my invention, however, no splitting relays are required. Instead the off-hook signal is applied by register sender 18 to lead SIG. Lead SIG is connected to apply a signal that introduces an off-hook indicating bit into the left-most bit position of register 109. This bit will be shifted out of register 109 under the control of signals appearing at the output of gate 110 and will be forwarded through AND gate 112, lead CO—1 and path 15—1 to the called office.

Gate 110 provides the signals for outpulsing register 109 after relay CC, mentioned above, operates. Relay CC at its make contact CC—1 completes a path in lead D—1 from the output of gate 121—1 to the input of inhibit gate 110. Lead D—1 is provided with a sequence of 9 impulses generated by cross-office clock 124 which occurs at a rate low enough to be transmitted through network 15 without causing excessive crosstalk in adjacent links.

For present purposes, let it be assumed that the "off-hook" bit is transmitted cross-office to the remote called office and in time the remote called office returns a "register-attached" signal over path 15—1, lead OC—2, and OR gate 115 to E-register 127. The register-attached signal will be detected by its persistence in the appropriate bit position of register 127 by integrating amplifier IA2 under control of gate 130 and counter 132. (The manner in which counter 132 operates in response to incoming data will be described presently.) Amplifier IA2 then applies a signal to lead GIS to inform register-sender 18 that it may commence applying call signaling information to lead SIG. The information appearing on lead SIG is entered into the left-most bit position of register 109 and is transmitted cross-office in the manner previously described. Eventually the remote office establishes a connection to the called party, applies ringing and returns called party answer supervision over path 15—1. This signal is received in E-shift register 127 and detected by integrating amplifier IA2 under control of an appropriate pulse count output of counter 132 operating gate 130. Amplifier IA2 operates relay CS. Relay CS operated at its make contact CS—1 notifies register-sender 18 of called party answer and the register-sender then may disconnect in the usual manner. The called party answer information is then shifted out of E-register 127 to F-register 125 in a manner hereinafter to be described and the remote calling office (not shown) at the distant end of line 5 may now commence transmitting encoded speech samples.

In the illustrative embodiment, I have chosen to transmit the information whether encoded speech samples, supervisory, or call signaling across office 16 from A-shift register 109 in FIG. 1 to B-shift register 200 of FIG. 2 during an interval of time that is somewhat less than the duration of one frame of signaling on line 5. Assuming that the time division signaling frame contains 24 time slots, I have selected the bit rate of cross-office clock 124 to transmit the nine-bit contents of A-shift register 109 during an interval equal to 21 time slots of the 24 time slot frame of line 5, or 108 microseconds. Cross-office clock 124 will thus have a pulse repetition rate of 82.7 kilobits per second.

Moreover, since the A-register in each of the trunks 8—1 through 8—24 is loaded from line 5 at intervals of 5.17 microseconds, the unloading of these registers may commence at intervals of 5.17 microseconds. Accordingly, each of leads TSC—1 through TSC—24 is connected through a respective one of monopulsers MP—1 through MP—24 to activate AND gates 121—1 through 121—24. Each of monopulsers MP—1 through MP—24 is triggered by the trailing edge of the respective signal applied by time slot distributor 3 to leads TSC—1 through TSC—24. Each of monopulsers MP—1 through MP—24, when triggered, enables its associated one of gates 121—1 through 121—4 throughout the duration of a 21 time slot interval. Thus, 9 readout bits are provided by cross-office clock 124 to each of leads D—1 through D—24 in overlapping sequence.

Accordingly, as soon as time slot distributor 3 removes the signal energization of lead TSC—1, nine pulses at the 82.7 kilobit rate begin to appear at the output of gate 121—1 and are applied to lead D—1. With relay CC operated after the completion of cross-office path 15—1, and inhibit gate 110 enabled by the removal of the energization from lead TSC—1, a path is completed for the nine-bit sequence appearing on lead D—1 through OR gate 113 to the input of A-shift register 109 and to AND gate 112 as well. The nine-bit sequence applied to the input of the A-shift register 109 causes the nine-bit Contents of this register to be applied through AND gate 112 to lead CO—1, link 15—1 of network 15 and lead OC—1 of PCM trunk circuit 41—1 of FIG. 2, through OR gate 201 and, finally, to be entered into B-shift register 200.

When the nine bits have been entered into B-shift register 201, the initial "1" bit that was put into A-shift register 109 arrives in the right-most stage of shift register 200 and sets X flip-flop 202. X flip-flop 202 then enables inhibit gate 203, the inhibit input being removed after the ninth bit has been applied over lead OC—1. With inhibit gate 203 enabled, office clock 204 applies clock pulses at the TDM characteristic rate of 1.544 megabits per second to nine-counter 205 and through the lower input of OR gate 201 to B-shift register 200. The first of the clock 204 pulses causes the right-most "1" bit in shift register 201 to be applied to lead 207 setting Y flip-flop 208. The "1" output of Y flip-flop 208 is not effective, however, to set Z flip-flop 210 until the pulse which appeared on lead 207 to set Y flip-flop 208 has disappeared. When the initial "1" that has been shifted out of A-shift register 200 disappears from lead 207, inhibit gate 209 is unblocked thereby allowing the "1" output of Y flip-flop 208 to set Z flip-flop 210. With Z flip-flop 210 set, AND gate 212 is enabled and the next eight pulses applied by clock 204 will cause the eight-bit pattern of the actual time slot that is stored in B-shift register 200 to be applied through AND gate 212 and OR gate 214 to C-shift register 215. At this time counter 205 will energize lead 216 resetting X flip-flop 202, Y flip-flop 208, Z flip-flop 210 thereby readying B-shift register 200 to receive another sequence of cross-office data.

With the first time slot sequence of line 5 thus registered in C-shift register 215, the contents thereof will be transferred to outgoing TDM line 40 under control of line clock 47. Pulses from line clock 47 at the 1.544 megabit rate are applied through AND gate 220 and the upper input of OR gate 214 to read out the contents of C-shift register 215. AND gate 220 is enabled and time slot distributor 44 energizes lead DSC—1. Simultaneously, AND gate 221 at the output of C-shift register 215 is enabled and the contents of the C-shift register is transferred to transmitter 45 and applied to TDM line 40 under control of line clock 47.

It will be noted that the transmission of the contents of C-shift register 215 to transmitter 45 occurs simultaneously with the delivery of information from receiver 42 into D-shift register 226 through OR gate 225 and AND gate 224. Thus, information transmitted in the opposite direction from the remote office (not shown) at the distant end of TDM line 40 is entered into D-shift register 226 at the same time that information destined for the remote office is transferred to line 40 from C-shift register 215. Thus, while PCM trunk circuit 41—1 has so far been described as an outgoing trunk with respect to the information entered into A-shift register 109, it is in reality a trunk that passes information in two directions and receives information from line 40 for transmission cross office to trunk 8—1 and delivery to the office at the remote end of TDM line 5.

D-shift register 226, in receiving the information from receiver 42 under control of time slot distributor 44, operates in substantially identical manner to that in which A-shift register 109 operated with respect to the data furnished it by receiver 7. Thus, as soon as lead DSC—1 is de-energized by time slot distributor 44 and inhibit gate 227 is unblocked, the nine bit contents of shift register 226 will be applied through AND gate 227 to lead CO—2 at the 82.7 kilobit rate dictated by cross-office clock 234.

The signals applied on lead CO—2 are forwarded through cross-office link 15-1 of network 15 and appear on lead OC—2 of PCM trunk circuit 8—1 in FIG. 1 where they are entered through OR gate 115 into E shift register 127.

AND gate 130 responds to the appearance of call supervisory information in the appropriate bit position of E-shift register 127 in the manner previously described, i.e., as the contents of E-shift register 127 are shifted out under the control of office clock 131 the position of the answer supervision bit in E-shift register 127 is identified by an output of counter 132. In trunk 8—1, flip-flops U, V, and W perform with respect to transferring information from E-register 127 to F-register 125 the same functions as flip-flops X, Y, and Z of trunk circuit 41—1 of FIG. 2 did with respect to B-register 200 and C-register 215. Similarly, gates 135, 136 and 137 perform the same functions incident to the transfer of information from E-shift register 127 into F-shift register 125 and the transfer of information from the latter register to transmitter 6 as gates 212, 214, and 220 did with respect to B-shift register 200, C-shift register 215 and transmitter 45.

It will be recalled that in connection with the description of the initial setting up of a cross-office connection from trunk 8—1 to trunk 41—1, it was necessary to inform the office at the remote end of line 5 of the completion of a connection through incoming register link 19 to register 18. This was accomplished by register 18 operating relay RA and the latter, at its contact RA—1, entering a call supervisory (register-attached) bit into an appropriate bit position of F-shift register 125. The contents of F-shift register 125 including the call supervisory bit are periodically applied to transmitter 6 under control of line clock 139 and time slot distributor 3. When time slot distributor 3 energizes lead TSC—1, AND gate 137 is enabled and clock pulses from clock 139 at the 1.544 megabit rate are applied through AND gate 137 and OR gate 136 to readout the contents of F-shift register 125 through AND gate 140 to transmitter 6. The remote office is thereby informed that a register has been attached so that that office may commence sending called number and other call information.

SUMMARY

Thus, I have shown an illustrative embodiment of my invention in which the contents of the time slot channels of an incoming time division multiplex line have been entered into a corresponding plurality of shift registers and transmitted cross office in a time interval less than the interval of a complete frame of time slots. Moreover, I have enabled time division multiplex lines to be switched through a conventional telephone switching office with a minimum of modification and with minimal transmission delay.

It will be apparent to those of skill in the art that numerous modifications of the embodiment described herein may be made without departing from the spirit and scope of the invention. Thus, for example, it should be apparent that the connection to the incoming register may be started by notifying common control 17 instead of link 19. Similarly, integrating amplifier 109IA may be replaced by a digital decoder if call signaling information is to be represented in a time slot by a bit pattern instead of by only a single bit in a predetermined position. Similarly, the call signaling information would be directly applied to register 18 if lead CO—1 were also given an appearance in cable TR. Likewise register 18 may include a digital/analog converter portion 18*a* for matching the particular characteristics of register 109 to the vagaries of the particular register-sender found in a given office.

From the foregoing description, it should be apparent that the present invention inherently provides for interchange of time slots between an incoming trunk on time division multiplex line such as line 5 and the outgoing trunk on time division multiplex line such as line 40 and is therefore immune from blocking. Moreover, since the signals outgoing over line 40 are under the control of line clock 47, the time slot signals have been resynchronized. In accordance with my embodiment, therefore, I have employed a conventional space division switching network 15 to establish a connection from any channel of an incoming time division multiplex line to any channel of an outgoing time division multiplex line without any need to store the identity in the system of the particular time slots involved. Further and other modifications of the embodiment will be apparent to those of ordinary skill in the art.

What is claimed is:

1. An arrangement for switching communications channels carried by time division multiplex lines through a space division switching network of a switching office having a common control unit, comprising,

- a trunk circuit for each of said communications channels carried by one of said time division multiplex lines, each of said trunk circuits having an appearance in said switching network,
- means for storing in each said trunk circuit the contents of a respective incoming one of said communications channels,
- means responsive to the appearance of a predetermined code in said storing means for signaling said common control unit to establish a cross-office connection in said switching network,
- means for transmitting the contents of said stored channel through said established cross-office connection at a bit transmission rate lower than the characteristic pulse repetition rate of any of said time division multiplex lines,
- means for receiving said communications channel information transmitted over said cross-office connection, and
- means for transferring said received channel information from said receiving means to an outgoing one of said time division multiplex channels at said characteristic pulse repetition rate.

2. An arrangement for switching communications channels carried by time division multiplex lines through a witching network of a common control switching office, said office having an incoming register normally operable to receive call signaling information from an incoming trunk, an incoming register link operable to connect a trunk in the calling condition to said incoming register, and a common control for establishing a cross-office connection through said network in response to information received in said register over said link, comprising,

- first means in each of said trunk circuits for storing the contents of one of said communications channels incoming from a distant office,
- second means in said trunk circuit for storing information destined for said distant office,
- means for detecting the storage of information in said first storing means representing a request for the establishment of a cross-office connection,
- means controlled by said detecting means for operating said incoming register link to connect said incoming register to said first storing means,
- means responsive to the connection of said incoming register to said first storing means for making an information entry into said second storing means for transmission to said distant office, and
- means operative subsequent to the establishment of said cross-office connection by said common control for transmitting the contents of said first storing means through said cross-office connection at a bit transmission rate lower than the characteristic pulse repetition rate of said time division multiplex lines.

3. An arrangement for switching time division multiplex signals through a telephone central office having a switching network, comprising

- an incoming time division multiplex line appearing at one side and an outgoing time division multiplex line appearing at the other side of said switching network, said incoming line defining a number of information carrying time slots, a first plurality of shift registers equal in number to the number of time slots defined by said incoming line, said registers being connected between said incoming line and said one side of said network, means for storing the contents of said time slots defined by said incoming line in respective ones of said shift registers, a plurality of pulse sources equal in number to the number of said time slots, said pulse sources having a repetition rate low enough to prevent excessive crosstalk in said switching network, a second plurality of shift registers connected between said other side of said network and said outgoing time division line, and means for sequentially connecting said pulse sources to transfer the contents of successive ones of said first plurality of registers through said network to respective ones of said second plurality of registers during a plurality of said time slot intervals.

4. An arrangement for switching communications channels carried by time division multiplex lines through a switching network of a common control switching office adapted normally to establish cross-office connections between incoming and outgoing trunks appeaRing in said switching network comprising, an incoming time division multiplex line and an outgoing time division multiplex line each adapted to carry information at a characteristic pulse repetition rate higher than that normally transmissible through said switching network without causing excessive crosstalk, first and second storing means associated respectively with each of said outgoing and each of said incoming time division multiplex lines, means for storing the contents of an incoming one of said channels in said first storing means associated with said incoming time division multiplex line, and means for transmitting the contents of said first storing means associated with said incoming time division multiplex line to said second storing means associated with said outgoing time division multiplex line at a rate lower than said characteristic repetition rate.

5. A method of switching through a telephone central office time division multiplex signals arriving over a line from a remote central office, certaln of said signals including call signaling information, comprising registering the contents of each time slot defined by a frame of time division multiplex signals in a respective input buffer, establishing a cross-office connection to a second buffer of a trunk identified by the call signaling information contained in said input buffer, and outpulsing the contents of said input buffer into said second buffer during an interval of time less than the duration of said frame but substantially longer than the duration of one of said time slots.

6. A method in accordance with claim 5 wherein said outpulsing is effective under the control of a pulse source rendered operative immediately following the loading of said input buffer.

7. A method in accordance with claim 5 wherein said cross-office connection is established by identifying a signal signifying a request for a cross-office connection in said input buffer, establishing a connection to extract call signaling information subsequently appearing in said input buffer, and signaling said remote central office to commence sending said call signaling information.

8. A method in accordance with claim 6 wherein said frame of time division multiplex signals includes N time slots wherein said input buffer is loaded during one of said time slots and wherein said second buffer is loaded during an interval longer than one said time slot but shorter than the N—1 time slots next ensuing after said input buffer is loaded.

9. An arrangement for switching through a telephone central office time division multiplex signals arriving over a line from a remote central office comprising a plurality of input buffers equal to the number of time slots defined by a frame of said time division multiplex signals, means for entering in a respective one of said buffers the contents of a corresponding one of said time slots, a plurality of outgoing trunks identifiable in accordance with call signaling information contained in said input buffers, means for establishing a cross-office connection from each of said input buffers to one of said outgoing trunks identified by the call signaling information contained in the respective input buffer, means including a plurality of sources for delivering during an interval of time longer than that of one of said time slots but less than that defined by a complete frame of time slots a sequence of pulses equal in number to the number of bits contained in said input buffer and means for applying each of said sources to a respective one of said input buffers after the respective buffer has been loaded with information from a corresponding one of said time slots in said frame to thereby outpulse the contents of said respective one of said buffers.

* * * * *